United States Patent
Simon et al.

(12)

(10) Patent No.: US 6,910,507 B2
(45) Date of Patent: Jun. 28, 2005

(54) PIPES CONTAINING HEAT INSULATING MATERIAL

(75) Inventors: Jean-Michel Simon, Chatillon (FR); Nicolas Garois, Amilly (FR)

(73) Assignee: Hutchinson, Paris (FR)

(*) Notice: Subject to any disclaimer, the term of this patent is extended or adjusted under 35 U.S.C. 154(b) by 0 days.

(21) Appl. No.: 10/182,744

(22) PCT Filed: Feb. 13, 2001

(86) PCT No.: PCT/FR01/00409
§ 371 (c)(1),
(2), (4) Date: Nov. 13, 2002

(87) PCT Pub. No.: WO01/60910
PCT Pub. Date: Aug. 23, 2001

(65) Prior Publication Data
US 2003/0150504 A1 Aug. 14, 2003

(30) Foreign Application Priority Data
Feb. 15, 2000 (FR) .............................. 00 01822
May 30, 2002 (FR) .............................. 00 06896

(51) Int. Cl.⁷ ................................................ F16L 9/14
(52) U.S. Cl. ...................... 138/146; 138/149; 428/36.91
(58) Field of Search ................................ 138/146, 149; 428/36.91

(56) References Cited

U.S. PATENT DOCUMENTS

| | | | | | |
|---|---|---|---|---|---|
| 3,744,505 A | * | 7/1973 | Huvey et al. | ............ | 137/68.14 |
| 4,393,901 A | * | 7/1983 | Beck | ............ | 138/145 |
| 4,713,271 A | * | 12/1987 | Searl et al. | ............ | 428/36.5 |
| 4,744,842 A | * | 5/1988 | Webster et al. | ............ | 156/78 |
| 4,874,648 A | * | 10/1989 | Hill et al. | ............ | 428/35.9 |
| 5,855,977 A | * | 1/1999 | Fukushi et al. | ............ | 428/36.6 |
| 6,058,979 A | * | 5/2000 | Watkins | ............ | 138/149 |
| 6,305,429 B1 | * | 10/2001 | Welch et al. | ............ | 138/149 |
| 6,604,551 B2 | * | 8/2003 | Nishi et al. | ............ | 138/137 |
| 6,655,414 B2 | * | 12/2003 | Nishi et al. | ............ | 138/137 |

FOREIGN PATENT DOCUMENTS

| | | |
|---|---|---|
| DE | 24 08 152 | 8/1974 |
| EP | 0 428 158 | 5/1991 |
| EP | 0 969 039 | 1/2000 |
| JP | 2281504 | 11/1990 |

* cited by examiner

*Primary Examiner*—James Hook
(74) *Attorney, Agent, or Firm*—Oblon, Spivak, McClelland, Maier & Neustadt, P.C.

(57) ABSTRACT

The invention concerns the use of a material comprising at least a crosslinkable elastomer selected from the group consisting of butyl rubber, halobutyls and brominated isobutylene and para-methylstyrene copolymers, and at least a non-crosslinkable elastomer with low thermal conductivity for thermal insulation, in particular for pipes. The invention also concerns a pipe, and, in particular a submarine oil pipe for great depths, comprising at least a layer of said material.

20 Claims, No Drawings

PIPES CONTAINING HEAT INSULATING MATERIAL

The present invention relates to the use of a material based on a crosslinkable elastomer and on a noncrosslinkable elastomer of low thermal conductivity for producing thermal insulation and in particular the thermal insulation of pipes, in particular of undersea oil pipes, and to pipes which comprise at least one layer of this material.

The extraction of oil from undersea deposits requires the use of metal pipes, in particular for conveying the oil from the drilling site to the place where it is recovered and optionally stored.

During drilling, the oil is extracted at a temperature of 70 to 120° C. During its transportation to the surface, it is cooled by the surrounding seawater. In point of fact, it is essential for the temperature of the oil extracted to be maintained at a value of greater than approximately 50° C., so as to prevent it from becoming too viscous and from setting solid in the pipes.

For their thermal insulation, pipes are currently composed of two coaxial metal lines, between which is inserted a rigid foam, conventionally a polyurethane, or a material of syntactic type, namely a rigid material, such as polyurethane, in which hollow glass microspheres are incorporated.

These pipes nevertheless exhibit the disadvantage of not being able to be used below a depth of 200 to 300 meters, that is to say at a pressure of greater than 200 to 300 bar, beyond which pressure neither the rigid foam nor the material of syntactic type offers sufficient mechanical strength.

Provision has also been made to have available, around oil transportation pipes, heating systems consisting of water and gas pipework. Such systems are nevertheless too complex and expensive to be satisfactory from an industrial viewpoint.

The inventors therefore set themselves the aim of providing for a material of low thermal conductivity, capable of ensuring thermal insulation and in particular the thermal insulation of undersea oil pipes, which overcomes the disadvantages of the thermal insulation systems provided to date and which can be used down to depths of 3000 meters.

Materials which comprise a butyl rubber in combination with a polyisobutylene are known from German patent application No. 2 408 152 and from Japanese patent application No. 2 281 504. According to DE-A-2 408 152, such a combination results in a material which is characterized by a high mechanical dissipation capacity and which makes it possible to deaden the vibrations and noise and to improve the rubbing. In JP-A-2-281504, the material is provided in the form of wound sheets or strips for insulating high-tension electrical cables.

These materials are under no circumstances described as capable of providing thermal insulation.

A subject matter of the present invention is the use of a material comprising at least one crosslinkable elastomer selected from the group consisting of butyl rubber, halobutyls and brominated copolymers of isobutylene and of para-methylstyrene and at least one noncrosslinkable elastomer of low thermal conductivity for producing thermal insulation.

Within the meaning of the present invention and in that which follows, the term "low thermal conductivity" is understood to mean a thermal conductivity of less than or equal to 0.140 $W.m^{-1}.K^{-1}$, the latter being measured using a device sold under the Anter trademark according to the standard ASTM E 1530.

The term "halobutyl" is understood to mean both chlorobutyls and bromobutyls, such as chlorobutyl 1066 and bromobutyl x2, sold by Exxon.

Mention may be made, as examples of butyl rubber and of brominated copolymers of isobutylene and of para-methylstyrene which can be used according to the present invention, respectively of butyl 365, sold by Bayer, and Exxpro® 90-10, sold by Exxon.

The thermal conductivities of the elastomers exemplified above are of the order of 0.118 (for Exxpro® 90-10) to 0.125 $W.m^{-1}.K^{-1}$.

Said noncrosslinkable elastomer of low thermal conductivity present in the material is advantageously a polyisobutylene. Mention may be made, for example, of Vistanex® MML 80 and Vistanex® MML 120, sold by Exxon, the thermal conductivities of which are respectively 0.122 and 0.125 $W.m^{-1}.K^{-1}$.

According to an advantageous arrangement of the invention, the material furthermore comprises at least one thermoplastic of low thermal conductivity chosen from fluorinated thermoplastics and polyolefinic thermoplastics and at least one thermosetting plastic of low thermal conductivity.

Said polyolefinic thermoplastic consists, for example, of a polypropylene, while said fluorinated thermoplastic is advantageously a terpolymer of tetrafluoroethylene, of hexafluoropropylene and of vinylidene fluoride, commonly known as THV and sold, for example, under the names Dyneon® 400 and Dyneon® 500 by 3M. Its thermal conductivity is of the order of 0.140 $W.m^{-1}.K^{-1}$.

Furthermore, said thermosetting plastic of low thermal conductivity is advantageously a polyimide, such as the Vespel® and Capton® polyimides, sold respectively by Du Pont de Nemours and 3M, the thermal conductivities of which are of the order of 0.120 $W.m^{-1}.K^{-1}$.

It is clearly understood that the material used in accordance with the present invention can also comprise, as is known in connection with any formulation based on elastomers, an appropriate crosslinking system and various additives conventionally employed in the polymers industry, such as, without implied limitation, activators (active zinc oxide, for example), complexing agents (for example stearic acid), plasticizers (for example a naphthenic or paraffin oil), lubricants (for example a polyethylene glycol), processing aids (such as Crodamide® ER sold by Croda), or compatibilizing agents, such as an SEBS which may or may not be modified by maleic anhydride.

A small amount of antimony oxide can also be introduced as nonreinforcing filler for better processability of the material, this being achieved without influencing its thermal conductivity. This filler is advantageously introduced at a level of at most 50 parts by weight and preferably at a level of 20 parts by weight.

With regard to the abovementioned crosslinking system, it can be any system known in the polymers industry, such as a system for crosslinking by organic peroxides, by metal oxides (active zinc oxide+DHT4A2+ZBEC, for example), by phenolic resins (brominated or nonbrominated phenolic resins, such as those sold by Schenectady under the references SP1045 or SP1055) or by sulfur donors, preferably not generating nitrosamine (Renocure® SG+Deovulc® BG 187 or Sulfadon® CLD+Deovulc® BG 187). Among these crosslinking systems, phenolic resins have proved to be particularly well suited to the preparation of the material as they make it possible to obtain highly satisfactory mechanical properties.

According to another advantageous arrangement of the invention, the material comprises:
between 30 and 120 parts by weight of said crosslinkable elastomer, between 20 and 100 parts by weight of said noncrosslinkable elastomer, between 0 and 100 parts by weight, preferably between 20 and 100 parts, of said thermoplastic, and between 0 and 100 parts by weight of said thermosetting plastic.

In a particularly advantageous way, the material used in accordance with the invention exhibits a thermal conductivity of less than or equal to 0.140 $W.m^{-1}.K^{-1}$, preferably of less than or equal to 0.130 $W.m^{-1}.K^{-1}$.

The material used in accordance with the invention exhibits the advantages of being flexible, because of the presence of compounds of elastomeric nature, and of exhibiting a particularly low thermal conductivity, as indicated above.

Surprisingly, they can be manufactured and processed in the absence of reinforcing or nonreinforcing fillers, such as carbon black, silica, chalk and kaolin, fillers which are conventionally used in the polymers industry and which increase the thermal conductivity of materials.

In addition, this material is compact, that is to say of noncellular nature, which confers on it an excellent resistance to pressure, a particularly advantageous characteristic for its use at great undersea depths, as will be described in more detail subsequently.

According to yet another advantageous arrangement of the invention, the material additionally comprises hollow glass microspheres, for example the glass microspheres of 38/4000 grade sold by 3M.

The presence of these hollow glass microspheres makes it possible to lower the relative density of the material, from approximately 0.98 (in their absence) to approximately 0.65, a fall in relative density which is particularly advantageous for its floatability. These glass microspheres also contribute to a fall in the thermal conductivity of the material according to the present invention, a fall which becomes more pronounced in proportion as the percentage by volume of glass microspheres increases, which percentage can reach 60% by volume. It is thus possible to obtain materials with a thermal conductivity of the order of 0.09 $W.m^{-1}.K^{-1}$.

The incorporation of the hollow glass microspheres in the material can be carried out using a twin-screw extruder, a first compartment of which comprises said microspheres and a second compartment of which comprises either the combined ingredients of the material blended beforehand, in the case of a process for the manufacture of the material as a conventional rubber, or the combined ingredients of the material crosslinked beforehand dynamically (namely simultaneously subjected to mixing and to stationary phases of increasing temperatures), in the case where the material is manufactured as a thermoplastic elastomer (which is in particular the case when the material comprises a thermoplastic).

Silanes can also be used for the purpose of providing better bonding between the glass microspheres and the elastomers present in the material.

According to a preferred arrangement of the invention, the material is used for the thermal insulation of pipes.

Within the meaning of the present invention, the term "pipe" is understood to mean any tube, line, piping or the like for the conveyance of fluids.

A particularly advantageous use of the thermal insulation material according to the present invention is the insulation of undersea oil pipes, in particular of undersea pipes at great depth, for example at a depth of 2000–3000 meters.

Another subject matter of the present invention is a pipe, characterized in that it comprises at least one layer of a thermal insulation material as described above.

Such pipes comprise, for example, a metal tube coated on its external face with a layer of the material according to the invention, advantageously with a thickness of 20 to 40 mm.

The pipes according to the invention can, in a particularly advantageous way, be used at depths of 2000 to 3000 meters without being deformed by the pressures of 200 to 300 bar which prevail there, in contrast to the currently existing pipes, thus making possible the drilling of hitherto inaccessible oil layers.

In addition to the preceding arrangements, the invention also comprises other arrangements which will emerge from the description which will follow, which refers to examples of formulations of materials capable of being used for thermal insulation, in particular of undersea oil pipes at great depth, and of measurements of their thermal conductivity. It should be clearly understood, however, that these examples are given solely by way of illustration of the subject matter of the invention, of which they do not in any way constitute a limitation.

EXAMPLE 1

Formulation, Preparation and Thermal Conductivity of a First Material for Thermal Insulation The compounds used and their amounts, expressed as parts by weight, are summarized below:

| | |
|---|---|
| Butyl rubber 365 (Bayer) | 30 |
| Vistanex ® MML 120 (Exxon) | 70 |
| Naphthenic oil | 10 |
| Active zinc oxide (HB Chemical) | 5 |
| Stearic acid | 1 |
| Phenolic resin SP1055 (Schenectady) | 10 |

It is therefore a material based on a crosslinkable elastomer (the butyl rubber) and on a noncrosslinkable elastomer of low thermal conductivity (the Vistanex® MML 120).

The material is prepared as a conventional rubber: the combined compounds are first placed in a mixer and then a stage of mixing is carried out in accordance with the techniques known to a person skilled in the art in connection with rubbers. After a stage of forming the material, the latter is vulcanized using a compression molding press for 15 minutes and at 180° C.

The thermal conductivity of the material thus obtained is 0.112 $W.m^{-1}.K^{-1}$.

EXAMPLE 2

Formulation, Preparation and Thermal Conductivity of a Second Material for Thermal Insulation The compounds used and their amounts, expressed as parts by weight, are summarized below:

| | |
|---|---|
| Exxpro ® 90-10 | 60 |
| Vistanex ® MML 80 | 20 |
| Dyneon ® 400 | 20 |
| Naphthenic oil | 10 |
| Polyethylene glycol 4000 | 2 |
| Crodamide ® ER | 0.5 |
| Active zinc oxide (HB Chemical) | 1.5 |
| DHT 4A2 | 2 |
| ZBEC | 1.5 |

It is therefore a material based on a crosslinkable elastomer (Exxpro® 90-10), on a noncrosslinkable elastomer of low thermal conductivity (Vistanex® MML 80) and on a fluorinated thermoplastic of low thermal conductivity (Dyneon® 400).

ZBEC corresponds to zinc dibenzyldithiocarbamate; this accelerator is sold by Safic-Alcan. With regard to DHT 4A2, it corresponds to a mixture of magnesium and aluminum oxides sold by Mitsui & Co. and also acts as accelerator for the crosslinking.

In view of the presence of the fluorinated thermoplastic, the material is prepared in the same way as a thermoplastic elastomer, that is to say with dynamic crosslinking during the blending of the combined ingredients.

The compounds listed above are thus placed in a mixer, the temperature of which is initially adjusted to 150° C., the speed of the rotors being 95 revolutions/minute and the pressure of the piston being 3.5 bar. The temperature of the blend is gradually increased according to the following protocol: at 1 minute, 135° C.; at 4 minutes, 210° C.; at 6 minutes, 215° C.; at 12 minutes, 230° C. The blend is then cooled while reducing the speed of the rotors and, when its temperature is approximately 180° C., it is subjected to calendering to produce a sheet with a thickness of 5 to 10 mm which is subsequently ground. The ground material is again mixed on a twin-screw extruder and extruded at the die outlet in the form of granules, which granules can subsequently be formed in accordance with the wishes of the user.

The thermal conductivity of the material thus obtained is 0.125 $W.m^{-1}.K^{-1}$.

EXAMPLE 3

Formulation, Preparation and Thermal Conductivity of a Third Material for Thermal Insulation The compounds used and their amounts, expressed as parts by weight, are summarized below:

| | |
|---|---|
| Exxpro ® 90-10 | 100 |
| Vistanex ® MML 80 | 50 |
| Naphthenic oil | 5 |
| Polyethylene glycol 4000 | 2.5 |
| Crodamide ® ER | 0.6 |
| Active zinc oxide (HB Chemical) | 2 |
| Renocure ® SG | 3 |
| Deovulc ® BG 187 | 2 |

It is therefore a material based on a crosslinkable elastomer (Exxpro® 90-10) and on a noncrosslinkable elastomer of low thermal conductivity (Vistanex® MML 80).

This material is also prepared with dynamic crosslinking during the blending of the combined ingredients, according to a procedure similar to that described in example 2.

The compounds listed above are thus placed in a mixer, the temperature of which is initially adjusted to 80° C., the speed of the rotors being 100 revolutions/minute. When the temperature of the blend reaches 200–230° C., the blend is cooled while decreasing the speed of the rotors and, when its temperature is approximately 180° C., it is subjected to calendering to produce a sheet with a thickness of 5 to 10 mm. This sheet is ground and the ground material is again mixed on a twin-screw extruder and extruded at the die outlet in the form of granules.

The thermal conductivity of the material thus obtained is 0.130 $W.m^{-1}.K^{-1}$.

As emerges from the above, the invention is in no way restricted to those of its implementations, embodiments and application forms which have just been described more explicitly; on the contrary, it embraces all the alternative forms thereof which can come to the mind of a technologist in the subject, without departing from the context or from the scope of the present invention.

What is claimed is:

1. A method comprising:

coating a pipe on an external face with at least one layer of a composition comprising at least one crosslinkable elastomer selected from the group consisting of butyl rubber, halobutyls, brominated copolymers of isobutylene and brominated copolymers of paramethylstyrene, and at least one noncrosslinkable elastomer of low thermal conductivity.

2. The method as claimed in claim 1, wherein the noncrosslinkable elastomer of low thermal conductivity is a polyisobutylene.

3. The method as claimed in claim 1, wherein the composition further comprises at least one thermoplastic of low thermal conductivity selected from the group consisting of fluorinated thermoplastics and polyolefinic thermoplastics, and at least one thermosetting plastic of low thermal conductivity.

4. The method as claimed in claim 3, comprising a fluorinated thermoplastic terpolymer comprising polymerized units of tetrafluoroethylene, hexafluoropropylene and vinylidene fluoride.

5. The method as claimed in claim 3, comprising a polypropylene.

6. The method as claimed in claim 3, wherein the thermosetting plastic of low thermal conductivity is a polyimide.

7. The method as claimed in claim 1, wherein the composition comprises between 30 and 120 parts by weight of said crosslinkable elastomer, between 20 and 100 parts by weight of said noncrosslinkable elastomer, between 0 to 100 parts by weight of a thermoplastic, and between 0 and 100 parts by weight of a thermosetting plastic.

8. The method as claimed in claim 1, wherein the composition has a thermal conductivity of less than or equal to 0.140 $W.m^{-1}.K^{-1}$.

9. The method as claimed in claim 8, wherein the thermal conductivity is less than or equal to 0.130 $W.m^{-1}.K^{-1}$.

10. The method as claimed in claim 1, wherein the composition further comprises hollow glass microspheres.

11. A pipe comprising at least one layer of a thermal insulation material comprising the composition of claim 1.

12. The pipe of claim 11, wherein said pipe is an undersea oil pipe.

13. The method as claimed in claim 1, wherein the composition is applied to a pipe.

14. The method of claim 13, wherein the pipe is an undersea oil pipe.

15. A pipe comprising at least one layer of a thermal insulation composition comprising at least one crosslinkable elastomer selected from the group consisting of butyl rubber, halobutyls, brominated copolymers of isobutylene and brominated copolymers of para-methylstyrene, and at least one noncrosslinkable elastomer of low thermal conductivity, wherein the thermal insulation composition is coated on an external face of the pipe.

16. The pipe of claim 15, wherein the pipe is an undersea oil pipe.

17. A method comprising applying to a substrate at least one layer of a composition comprising (i) at least one crosslinkable elastomer selected from the group consisting of butyl rubber, halobutyls, brominated copolymers of isobutylene and brominated copolymers of paramethylstyrene, (ii) at least one noncrosslinkable elastomer of low thermal conductivity (iii) at least one thermoplastic of low thermal conductivity selected fro the group consisting of fluorinated thermoplastics and polyolefinic thermoplastics, and (iv) at least one thermosetting plastic of low thermal conductivity.

18. A method comprising applying to a substrate at least one layer of a composition comprising (i) at least one crosslinkable elastomer selected from the group consisting of butyl rubber, halobutyls, brominated copolymers of isobutylene and brominated copolymers of paramethylstyrene, (ii) at least one noncrosslinkable elastomer of low thermal conductivity, (iii) a terpolymer comprising polymerized units of tetrafluoroethylene, hexafluoropropylene and vinylidene fluoride and (iv) at least one thermosetting plastic of low thermal conductivity.

19. A method comprising applying to a substrate at least one layer of a composition comprising (i) at least one crosslinkable elastomer selected from the group consisting of butyl rubber, halobutyls, brominated copolymers of isobutylene and brominated copolymers of paramethylstyrene, (ii) at least one noncrosslinkable elastomer of low thermal conductivity, (iii) a polypropylene and (iv) at least one thermosetting plastic of low thermal conductivity.

20. A method comprising applying to a substrate at least one layer of a composition comprising (i) at least one crosslinkable elastomer selected from the group consisting of butyl rubber, halobutyls, brominated copolymers of isobutylene and brominated copolymers of paramethylstyrene, (ii) at least one noncrosslinkable elastomer of low thermal conductivity, (iii) a polyimide and (iv) at least one thermoplastic of low thermal conductivity selected from the group consisting of fluorinated thermoplastics and polyolefin thermoplastics.

* * * * *